US007016657B2

(12) United States Patent
Boariu (10) Patent No.: US 7,016,657 B2
(45) Date of Patent: Mar. 21, 2006

(54) APPARATUS, AND ASSOCIATED METHOD, FOR COMMUNICATION SYSTEM UTILIZING SPACE-GENERATED MULTILEVEL CODING

(75) Inventor: Adrian Boariu, Irving, TX (US)

(73) Assignee: Nokia Corporation, Espoo (FI)

( * ) Notice: Subject to any disclaimer, the term of this patent is extended or adjusted under 35 U.S.C. 154(b) by 495 days.

(21) Appl. No.: 10/331,172

(22) Filed: Dec. 27, 2002

(65) Prior Publication Data

US 2003/0143962 A1    Jul. 31, 2003

Related U.S. Application Data

(60) Provisional application No. 60/353,098, filed on Jan. 30, 2002.

(51) Int. Cl.
    *H04B 1/02*     (2006.01)

(52) U.S. Cl. ...................... 455/102; 455/106; 455/103; 375/273; 375/308; 370/204

(58) Field of Classification Search ................ 455/106, 455/101, 562.1, 575.7, 517, 67.14, 403, 422.1, 455/424, 425, 550.1, 575.1, 452.1, 454, 435.2, 455/66.1, 103, 129, 502–504, 17, 67.11, 65, 455/525, 524, 561, 506, 67.13, 102, 115.4, 455/115.1–115.3, 126, 179.1, 296, 275, 278.1, 455/522; 375/265, 267, 240, 347, 219–222, 375/297, 367, 299, 146, 295, 341, 298, 262, 375/340, 220, 260, 261, 273, 308, 271, 306, 375/279–281; 370/525, 337–340, 204, 464, 370/207
See application file for complete search history.

(56) References Cited

U.S. PATENT DOCUMENTS

| | | | | |
|---|---|---|---|---|
| 5,966,412 | A | * 10/1999 | Ramaswamy | ............... 375/341 |
| 6,115,427 | A | 9/2000 | Calderbank et al. | |
| 6,298,092 | B1 | * 10/2001 | Heath et al. | ................ 375/267 |
| 6,333,926 | B1 | 12/2001 | Van Heeswyk et al. | |
| 2001/0038356 | A1 | 11/2001 | Frank | |
| 2003/0112880 | A1 | * 6/2003 | Walton et al. | .............. 375/260 |
| 2004/0082356 | A1 | * 4/2004 | Walton et al. | .............. 455/522 |

FOREIGN PATENT DOCUMENTS

WO     WO 00/72465     11/2000

* cited by examiner

*Primary Examiner*—Edward F. Urban
*Assistant Examiner*—Charles Chow
(74) *Attorney, Agent, or Firm*—Foley & Lardner LLP; G. Peter Albert, Jr.

(57) ABSTRACT

Apparatus, and an associated method, for forming a space-generated multilevel coding scheme for a radio communication system. Two or more modulators are positioned at a sending station. The modulators modulate, pursuant to separate modulation schemes, data that is to be communicated by the sending station. The modulation schemes are lower-order modulation schemes. The modulated data is communicated to a receiving station, and detected at a least single receive antenna. The modulated symbols formed by the separate modulators are superimposed theretogether and form symbols of a higher order modulation scheme.

18 Claims, 3 Drawing Sheets

APPARATUS, AND ASSOCIATED METHOD, FOR COMMUNICATION SYSTEM UTILIZING SPACE-GENERATED MULTILEVEL CODING

CROSS-REFERENCE TO RELATED APPLICATIONS

The present invention claims the priority of provisional patent application No. 60/353,098, filed on Jan. 30, 2002.

The present invention relates generally to a manner by which to communicate data in a communication system, such as a cellular communication system, that utilizes space diversity techniques. More particularly, the present invention relates to apparatus, and an associated method, by which to provide for data communications utilizing a space-generated multi-level coding scheme.

Multiple antennas are used at a sending station to provide space diversity, and at least a single antenna is used at a receiving station to detect data sent by the sending station. Data throughput rates corresponding to data rates achieved in a conventional MIMO (multiple-input, multiple-output) scheme are attainable without the corresponding receiving-station complexity required in a MIMO system to use multiple receive antennas.

BACKGROUND OF THE INVENTION

A communication system provides for the communication of data between a sending station and a receiving station. Communication of data between the communication stations of a communication system is a necessary aspect of modern society. And, the need to communicate data through the use of a communication system shall likely continue to be at least as essential in the future. A wide variety of different types of communication systems have been developed and are regularly utilized to effectuate many different types of communication services.

As technological advancements have permitted, new types of communication systems have been developed and implemented. Radio communication systems are exemplary of communication systems that have benefited from the technological advancements. Improvements to existing types of radio communication systems as well as new types of radio communication systems have been made possible as a result of the technological advancements.

Radio communication stations differ with conventional, wireline communication systems in that a communication path extending between sending and receiving stations includes, along at least a portion thereof, a radio link. Radio channels are defined upon the radio link, and the data is communicated upon one or more radio channels to the receiving station. A fixed, wireline connection is obviated for the portion of the communication path that utilizes the radio link.

Various advantages are provided through the use of a radio communication system. Installation and deployment costs, for example, of a radio communication system are sometimes less than the corresponding costs required to install and deploy a corresponding wireline counterpart. And, a radio communication system can be implemented as a mobile communication system in which one, or more, of the communication stations operable therein are permitted mobility, forming, as a result, a mobile communication system.

Many radio communication systems utilize digital communication techniques in which data that is to be communicated is first placed into digitized form and formatted, such as into data packets or frames, according to a selected formatting scheme. Once formatted, the data is modulated and communicated by a sending station to a receiving station. The data is communicated, for instance, in discrete bursts. When delivered to the receiving station, the modulated data is demodulated and the informational content of the data is recovered.

In an ideal communication system, the values of the data contained in each of the data packets or frames are of substantially identical values at the sending and receiving stations. That is, the values of the data are the same prior to transmission of the data to the receiving station as the values subsequent to their delivery to the receiving station. But, in an actual communication system, the values of the data are distorted and differ, sometimes significantly, when delivered to the receiving station in contrast to their corresponding values when transmitted by the sending station. If the values differ significantly, the informational content of the data might not accurately be able to be recovered.

Various communication conditions deleteriously affect the communication of the data, during its transmission by the sending station, to the receiving station. Multipath transmission conditions, for instance, cause the fading of the data during its transmission to the receiving station. Multipath transmission conditions are sometimes also referred to as fading conditions. The fading of the data alters the values of the data, or portions thereof, such that, when detected at the receiving station, the values of the data differ with corresponding values, when sent by the sending station. The fading conditions are sometimes modeled and categorized as being either quasi static flat fading or fast flat fading. Quasi static flat fading models a situation in which fading is flat in frequency and is constant during the duration of time during which a relevant portion of data is transmitted. In contrast, fast flat fading models a situation in which fading is flat in frequency but changes quickly between time periods. At a minimum, if the propagation distortion caused by fading is not properly corrected, the resultant communication quality levels of communications are, at a minimum, reduced.

Compensation is made for the propagation distortion introduced upon the data through the use of various techniques. By increasing the diversity of the data, the likelihood that the informational content of the data can be recovered is correspondingly increased.

Time diversity is one type of diversity that is sometimes increased. When data is time-encoded, for instance, the redundancy of the data is increased. Due to the increased redundancy, loss of portions of the data due to communication upon a communication channel that exhibits fading conditions is less likely to prevent the informational content of the data to be recovered.

Space diversity is another type of diversity that is sometimes increased. Space diversity, typically, refers to the utilization of more than one transmit antenna at a sending station at which to transduce the data that is to be communicated. The antennas are separated by selected separation distances to provide selected levels of correlation of the data communicated by the different ones of the antennas. Traditionally, the separation distances are selected to ensure that the data communicated by the respective transducers fade in an uncorrelated manner.

Multiple antennas are sometimes also used at the receiving station. Data detected at different ones of the antennas at the receiving station are also used to help compensate for the propagation distortion.

A communication system in which multiple transmit antennas and multiple receive antennas are utilized is sometimes referred to as an MIMO (multiple-input, multiple-output) communication system. The number of receive antennas is generally, but not necessarily, at least as great as the number of transmit antennas in an MIMO communication system.

In an MIMO communication system, independent data streams can be transmitted at different ones of the multiple transmit antennas. Communications in an MIMO system not only provide for improved communications upon non-ideal channels, but also permit the data throughput rate in such a communication system to be increased, generally corresponding to the increase in the number of transmit antennas. That is to say, the potential data throughput increase is linearly related with the number of transmit antennas that are utilized. And, to realize the potential data throughput increase permitted through the use of an MIMO system, the receiving station must also be able reliably to detect each of the individual data streams communicated by the sending station, in the presence of interference or fading conditions.

Space-time codes are sometimes used by which to encode the data that is to be communicated to increase the diversity at the receiving station by employing the multiple transmit antennas and encoding the data across the transmit antennas, in the time domain.

Both the space-time codes and the MIMO scheme usually benefit, performance-wise, if the antennas are uncorrelated or have low cross-correlation values. At the receiving station, the data is recovered due to the redundancy provided in time by the space-time codes and, respectively, the redundancy provided in space by the multiple receive antennas. Space-time coding does not require the use of multiple receive antennas of an MIMO system. But, conventionally, if the receiving station does not utilize the multiple receive antennas, the data throughput rate permitted in the system is reduced relative to the corresponding throughput rate permitted in a MIMO system that utilizes the multiple receive antennas.

When multiple receive antennas are utilized at the receiving station, relatively complex computational procedures are required to be performed at the receiving station to recover the informational content of the data received at the different ones of the receive antennas.

If a manner could be provided by which the data throughput rates permitted in a MIMO system that utilizes multiple receive antennas could be achieved while using only a single receive antenna, the benefits provided by a MIMO system, without the complexity associated with the recovery of data from the multiple receive antennas, would be achieved.

It is in light of this background information related to communication systems that utilize diversity techniques that the significant improvements of the present invention have evolved.

SUMMARY OF THE INVENTION

The present invention, accordingly, advantageously provides apparatus, and an associated method, by which to communicate data in a communication system, such as a cellular communication system, that utilizes space diversity techniques.

Through operation of an embodiment of the present invention, a manner is provided by which to provide for data communications utilizing a space-generated multi-level coding scheme.

Two or more antennas are used at a sending station to send independent signals, formed using separate, lower-order modulation schemes. The signals are delivered to the antennas at a receiving station. The transmitted signals are superimposed upon one another at the front end of the receiving station, and the lower-order modulation schemes are selected such that the values of the superimposed signals together define values of a higher-order modulation scheme.

The multiple number of antennas are used at a sending station to provide space diversity to the data sent therefrom. And, at least a single antenna is used at a receiving station by which to detect the data sent thereto by the sending station. Data throughput rates corresponding to the data rates achievable in a MIMO (multiple-input, multiple-output) system are achievable, but without the complexity associated with a multiple receive-antenna configuration.

In one aspect of the present invention, a manner is provided by which to facilitate communication of data by a sending station, such as the transmit part of a radio transceiver. The sending station utilizes a transmit diversity scheme in which spatial diversity is provided. Two, or more, spaced-apart antennas are used at the sending station to send data, modulated to form modulated symbols, upon a communication channel. The modulated symbols provided to the separate ones of the antennas are modulated pursuant to separate modulating mechanisms. A first modulator is coupled to a first antenna, and at least a second modulator is coupled to a corresponding at least second antenna. And, the modulators are each coupled to receive at least portions of the data that is to be communicated during operation of the sending station.

The first modulator operates pursuant to a first modulation scheme to modulate the data portions provided thereto according to the first modulation scheme. And, the second modulator operates pursuant to a second modulation scheme to modulate the data portions pursuant to the second modulation scheme. The modulation schemes, for instance, assign symbol values to successive parts of the data portions provided thereto. And, the symbol values are selected from a modulation constellation set of allowable symbol values.

In another aspect of the present invention, the modulated symbols formed by the separate modulators, transduced into electromagnetic form, and transmitted by the separate antennas are delivered to a receiving station. When delivered to the receiving station, the values of the modulated symbols, transmitted by the separate antennas are superimposed upon one another. The modulation schemes pursuant to which the first and at least second modulators are operable are selected so that, when the values of the modulated symbols are superimposed upon one another, the superimposed values are of values of a symbol set of a higher-order modulation scheme, i.e., a space-generated multilevel coding scheme.

The modulation schemes pursuant to which the first and at least second modulators are operable are, for example, lower-order modulation schemes. When values of the modulated symbols formed by the separate modulators are superimposed upon one another, such as at a receiving station to which the modulated symbols are transmitted, the superimposed, i.e., combined, values are of values corresponding to the values of the modulated symbols of a higher-order modulation scheme. For instance, the first modulation scheme pursuant to which the first modulator is operable is a 16QAM (16-quarternary amplitude modulation) scheme, the second modulation scheme pursuant to which the second modulator is operable is a QPSK (quarternary phase shift keying) modulation scheme, and the higher-order modulation scheme of which the superimposed values of the symbols formed by the first and second modulators are of values corresponding to symbols of a 64QAM (64-quarternary amplitude modulation) scheme. The symbols of a 64QAM scheme are also, for instance, formable by superimposing values of symbols formed by QPSK a modulation scheme in which three transmit antennas are utilized, each of which transmits QPSK-modulated symbols.

The lower-order modulation schemes pursuant to which the first and at least second modulators are operable form, for instance, constant-envelope modulation schemes. Through the use of constant-envelope modulation schemes at the first and at least second modulators of the sending station, the constraints on the linearity characteristics required of the power amplifiers utilized at the sending station to amplify the modulated symbols to transmission-strength are reduced relative to their counterparts that must preserve the envelope of a modulated signal formed of the values of the modulated symbols. That is to say, through the use of constant-envelope modulation schemes at the sending station, the linearity constraints on the power amplifiers used at the sending station are modest while still permitting symbols of higher-order modulation symbol set to be communicated that otherwise would require the use of a highly-linear power amplifier.

In another aspect of the present invention, complex signal weighting is selectably applied to the symbols formed by the first and at least second modulators. Power-imbalanced symbols are formable. By weighting the symbols, compensation can be made for the effects of fading upon the communication paths upon which the modulated symbols formed of the data are transmitted. The weighting factors by which the symbols are weighted are, e.g., externally-determined and provided to the sending station. Or, the weighting factors are pre-determined.

In another aspect of the present invention, the externally-determined weighting factors are selected at a receiving station, and indications of the selections of the weighting factors determined at the receiving station are returned to the sending station as part of a feedback mechanism. The feedback mechanism selectably provides full feedback information to the sending station, partial feedback information to the sending station, or another type of feedback information, such as relative channel-strength feedback information to the sending station. When full feedback information is provided to the sending station, separate weighting factors are returned to the sending station separately to weight the symbols applied to each of the antennas of the sending station. When partial feedback information is provided to the sending station, the amount of feedback information is reduced relative to when full feedback information is provided to the sending station. And, when relative channel-strength feedback information is provided to the sending station, a still-further lessened amount of feedback information is provided to the sending station.

The variation in channel conditions, and the corresponding amount of feedback information that is returned to the sending station is lessened when the communication paths upon which the data formed of the modulated symbols are transmitted are correlated. That is to say, by increasing the correlation of the communication paths, the variance of the weighting factors is reduced, reducing the range of values of which the weighting factors might be used. And, when the levels of correlation between the transmit antennas are significant, the feedback information that is returned to the sending station to indicate the weighting factors that are to be applied to the modulated symbols provided to the separate antennas can be completely eliminated.

One or more receive antennas are used at a receiving station when space-generated multilevel coding techniques are utilized. The superimposed values of the symbols sent by the separate transmit antennas of the sending station form symbols of a higher-order modulation scheme. Thereby, high data throughput rates are achievable while using only lower-order modulation schemes at the sending station. And, the lower-order modulation schemes comprise, for instance, constant-envelope modulation schemes permitting power amplifiers of lessened linearity constraints to be utilized. Also, by obviating the need for use of multiple receive antennas, while still permitting high data throughput rates to be achieved, the complexity required of the receiving station is reduced relative to a multiple-antenna counterpart. In one implementation, only a single receive antenna is utilized. In other implementations, multiple receive antennas are utilized.

In one implementation, an SGMC (space-generated multilevel coding scheme) is provided for a cellular communication system, such as a CDMA2000 system that provides for 1XEV-DO data communications. Either, or both of a base transceiver station and a mobile station of the cellular communication system include multiple transmit antennas and one or more receive antennas. The transmit parts of the respective devices include functionally separate lower-order modulators that modulate portions of the data that is to be transmitted therefrom. Modulated symbols formed by the separate ones of the modulators are communicated to upon communication paths to be detected by the receive parts of the respective devices. Detection is made at the receive antenna or antennas, and the data communicated thereto upon the separate communication paths is superimposed theretogether. Through appropriate selection of the modulation schemes used by the lower-order modulators, the superimposed values detected at the receive antennas are of values of the allowable symbol set of a higher-order modulation scheme.

In these and other aspects, therefore, apparatus, and an associated method, is provided for a first communication station operable in a communication system at least to send data, sourced at a data source, upon a communication channel. A first modulator is coupled to receive at least a first portion of a representation of the data to be sent by the first communication station. The first modulator modulates the at least the first portion of the representation of the data pursuant to a first modulation scheme to form first modulated symbols. The first modulation scheme utilizes a first constellation set of allowable symbol values. At least a second modulator is coupled to receive at least a second portion of a representation of the data to be sent by the communication station. The at least the second modulator modulates the at least the second portion of the representation of the data pursuant to a second modulation scheme to form at least second modulated symbols. The second modulation scheme utilizes a second constellation set of allowable symbol values. The first and second modulation schemes, respectively, are selected such that the first and second modulated symbols, when superimposed upon one another, form higher-order modulation symbols, selected pursuant to a higher-order modulation scheme.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
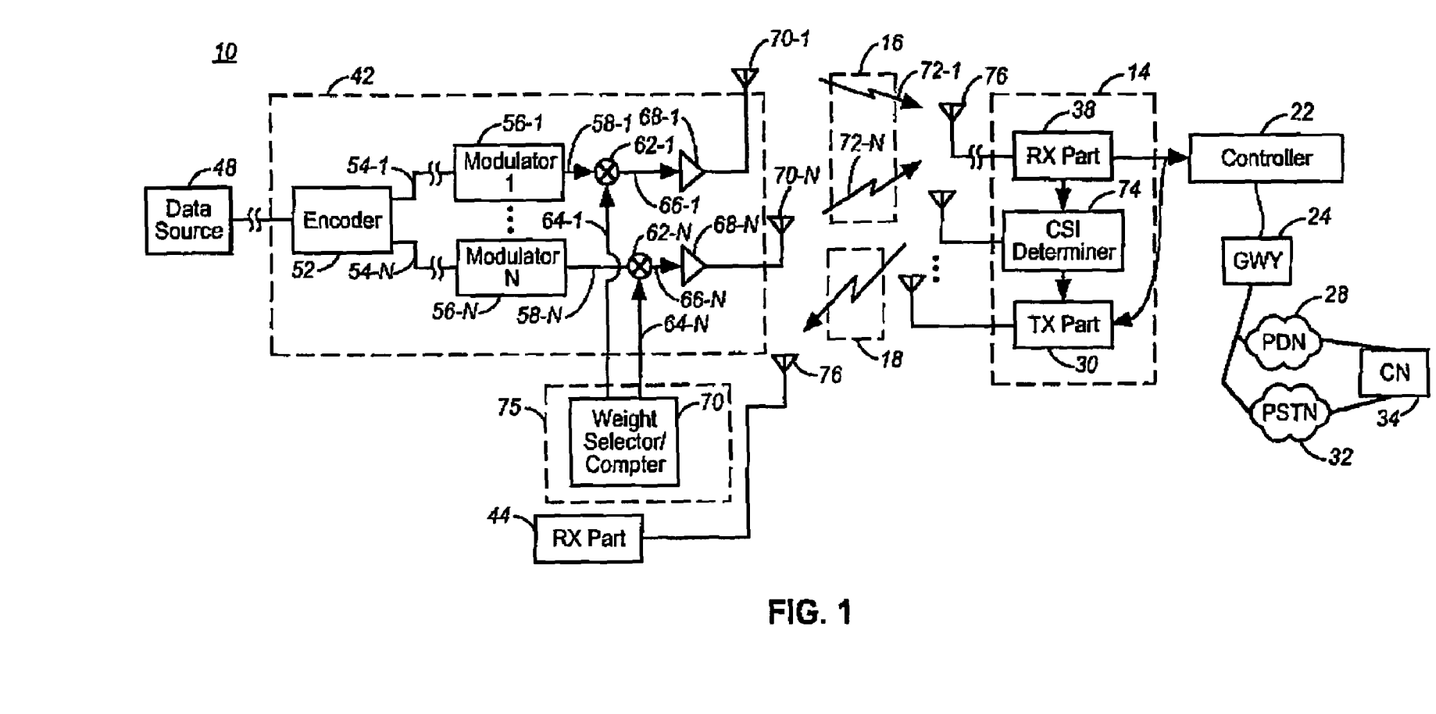
FIG. 1 illustrates a functional block diagram of a radio communication system in which an embodiment of the present invention is implemented.

Referring first to FIG. 1, parts of a radio communication system, shown generally at 10, provides for radio communications between radio communication stations, here represented by communication stations 12 and 14.

In the exemplary implementation, the communication system forms a cellular communication system operable, in general, to any selected digital cellular standard. For instance, the communication system 10 is representative of a CDMA2000 cellular communication system that provides for 1XEV-DO data communications. The communication system is also representative of other types of cellular communication systems, such as a GSM (General System for Mobile communications) system that provides for GPRS (General Packet Radio Service) or EDGE (Enhanced Data for GSM Evolution), each of which also provides for data communications. And, more generally, the communication system 10 is representative of many of various radio communication systems in which data is communicated upon communication channels susceptible to distortion, caused, for instance, by fading conditions.

Accordingly, while the following description shall describe operation of an embodiment of the present invention with respect to its implementation in a cellular communication system that provides for data communications, the present invention is analogously also operable in other types of radio communication systems.

The communication station 12 is here representative of a mobile station that communicates data upon channels defined upon radio links with a network part of the communication system. And, the communication station 14 is here representative of a base transceiver station (BTS) that forms a portion of the network part of the cellular communication system. The mobile station shall hereafter be designated at 12, and the base transceiver station shall hereafter be designated at 14.

The following description shall further describe exemplary operation of an embodiment of the present invention with respect to communication of data sourced at the mobile station 12 to the base transceiver station upon reverse-link channels defined upon a reverse link 16. Analogous description of operation can also be made with respect to communication of data sourced at the network part of the communication system and transmitted upon forward-link channels defined upon a forward-link 18 to the mobile station. And, more generally, operation of an embodiment of the present invention is implementable in any of various other radio communication systems in which a sending station utilizes space diversity techniques.

The base transceiver station (BTS) forms part of a radio access network part of the communication system. And, the radio access network part of the communication system is here further shown to include a controller 22. The controller is coupled between the base station system and a radio gateway (GWY) 24. The gateway forms a gateway with other parts of the communication system, here represented by a packet data network (PDN) 28 and a public-switched telephonic network (PSTN) 32. A correspondent entity (CE) 34 is coupled to the networks 28 and 32 and is representative of a data source, such as a data server, connectible to a packet data network formed of the internet.

The base transceiver station 14 of the base station system includes a transmit part 36 and a receive part 38 operable to form and transmit data that is to be communicated to the mobile station 12 and to detect, and to operate upon, reverse link signals generated by the mobile station and transmitted to the network part of the communication system.

Analogously, the mobile station also includes transmit and receive parts, here identified at 42 and 44, respectively. The transmit circuitry 42 of the mobile station operates to generate and to transmit the reverse link signals generated upon reverse link channels defined upon the reverse link 16.

Data sourced at a data source 48 is provided to the transmit part 42 of the mobile station. And, the transmit part includes an encoder 52 coupled to receive the data sourced at the data source. The encoder operates to encode the data provided thereto according to a selected encoding scheme and to generate the encoded data formed thereat on the lines 54-1 through 54-N. The transmit part further includes N separate modulators, here shown at 56-1 through 56-N. A two-modulator implementation is shown in FIG. 1. The line 54-1 extends to the modulator 56-1, and the line 54-N extends to the modulator 56-N. At least a first part of the encoded data is provided to the first modulator 56-1 and at least an nth part of the encoded data is provided to the nth modulator 56-N.

The first modulator 56-1 operates pursuant to a first modulation scheme to modulate the encoded data provided thereto according to the first modulation scheme. And, the nth modulator 56-N operates pursuant to an Nth modulation scheme to modulate the encoded data provided thereto according to the Nth modulation scheme. In the exemplary implementation, the modulators each operate to assign modulation symbol values to successive sequences of the data provided thereto, and the modulated data is formed of values of modulation symbols assigned to the successive sequences of the data. The modulation symbols assigned by the respective ones of the modulators are selected from allowable sets of modulation symbols, selected from modulation constellations associated with the respective ones of the modulators. Modulated symbols formed during operation of the modulator 56-1 are generated on the line 58-1, and modulated symbols formed during operation of the modulator 56-N are generated on the line 58-N.

The lines 58 extend to weighting elements, here weighting elements 62-1 and 62-N. The weighting elements weight the modulated symbols by weighting factors, here indicated by $w_1$ and $w_N$, applied to the weighting elements on the lines 64-1 and 64-N, respectively. The values of the weighting factors are selectable values and here are determined external to the mobile station and provided thereto during operation of the communication system.

Weighted, modulated symbols formed by the weighting elements are formed on the lines 66-1 and 66-N and are applied to power amplifiers 68-1 and 68-N, respectively. The power amplifiers amplify the symbols provided thereto to a transmission level, and amplified values are provided to antennas 70-1 and 70-N of an antenna assembly. The antennas are spaced-apart by selected separation distances to provide spatial diversity to the data communicated upon the reverse link. In one implementation, the antennas are positioned in a manner to reduce the levels of correlation between the channels, here indicated by the paths 72-1 and 72-N, upon which the data is communicated. In another implementation, increased levels of correlation between the channels are preferred, and the antennas are positioned in manners to facilitate such increased levels of correlation. Through the use of the multiple transmit antennas 68 to provide spatial diversity, improved compensation can be made for fading conditions upon the reverse link, thereby better to ensure that the informational content of the data communicated to the base transceiver station 14 can be recovered.

The lines 64 upon which the weighting factors are provided to the weighting elements 62 are here coupled to a weight selector/computer 73 that, in turn, is coupled to the receive part 44 of the mobile station. In the exemplary implementation, the values of the weighting factors are selected at the base transceiver station and communicated to the mobile station in the form of feedback information pursuant to a feedback mechanism. The base transceiver station includes a channel state information (CSI) determiner 74 that operates to form channel state information associated with the communication links extending between the mobile station and the base transceiver station. For corresponding communication procedures upon the reverse link, a corresponding channel state information determiner is formed at the mobile node, and channel state information is determined by monitoring values of pilot signals generated by the network part during operation of the communication system. The weight selector/computer 73 is here embodied at processing circuitry, designated at 75.

In the exemplary implementation, at least one receive antenna, here a single receive antenna 76, is positioned to detect the symbols generated upon the reverse link channels by the mobile node 12. When delivered to the receive antenna, the energies of signals formed of the symbols communicated upon the separate channels are superimposed theretogether. That is to say, combinations of the symbols formed upon the separate paths of the transmit part 42 are received at the receive antenna. Through appropriate selection of the modulation schemes pursuant to which the modulators 56 are operable, the superpositioned symbols form symbols of a selected higher order modulation scheme. And, more particularly, through appropriate selection of the modulation schemes, the modulation schemes utilized by the modulators 56 form lower-order modulation schemes, the superpositioning of the symbols of which form the symbols of the higher-order modulation scheme when detected at the receive antenna 76. The feedback information returned to the mobile station weights the symbols formed at the separate branches of the transmit part, e.g., to compensate for fading conditions on the reverse link, thereby to increase the separation distance between the symbols formed as a result of the superpositioning.

Because the higher order modulation scheme is provided as a result of the superpositioning of the symbols formed by the separate paths of the transmit part 42, the data throughput rate permitted in the communication system corresponds with the data throughput rates of a system that utilizes a multiple receive antenna implementation. And, while not separately illustrated, in the exemplary implementation, the transmit part 36 of the base transceiver station includes elements corresponding to those shown to form part of the transmit part 42. And, as noted briefly hereinabove, when the communication system is configured to work with feedback, the mobile station also includes a CSI determiner that determines channel state information that is returnable to the base transceiver station to be used pursuant to a feedback mechanism to provide values of weighting factors by which to weight the values of symbols that are to be communicated upon forward link channels defined upon the forward link to the mobile station.

Figure 2:
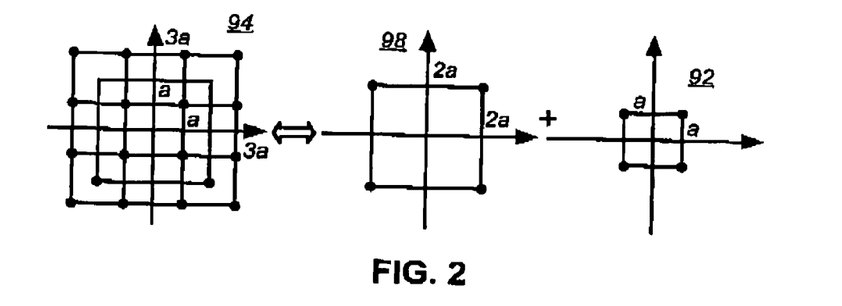
FIG. 2 illustrates a representation of the relationship between several exemplary modulation constellations, representative of modulation constellations utilized pursuant to operation of an embodiment of the present invention.

FIG. 2 illustrates the symbols sets, here shown at 88 and 92, of two lower-order modulation schemes together with the symbol set 94 of a higher-order modulation scheme. The constellation 88 has four times more power than the constellation 92. Here, the symbol set 94 is of a 16 QAM (quarternary amplitude modulation) scheme. And, the symbol sets 88 and 92 are each of QPSK (quarternary phase shift keying) modulation schemes. Superposition of the values of the two QPSK symbol sets 88 and 92 form the symbol set 94 of the 16 QAM modulation scheme. When, for instance, the modulators 56-1 and 56-N shown in FIG. 1 operate pursuant to the modulation schemes represented by the symbol sets 88 and 92, the superposition effect at the receive antenna 76 causes the received values of the symbols to be elements of the symbol set 94.

The exemplary symbol sets shown in FIG. 2 are considered for a Gaussian channel. While the symbols detected by the receive antenna are of the higher-order symbol set 94, through the use of the two transmit antennas and the QPSK modulation schemes on the separate transmit paths, constant envelope modulation is used at the transmit part. The constraints on the linearity requirements of the power amplifiers 68 are reduced when constant-envelope modulation techniques, rather than a nonconstant-envelope modulation technique. In another example, the symbol set of a 64 QAM modulation technique is formable through the superpositioning of symbols of a 16 QAM scheme and a QPSK scheme. And, in another example, the symbol set of the 64 QAM scheme can be formed through the superpositioning of three QPSK symbol sets.

Formation of the higher-order symbols through the combination of the two or more lower-order modulated symbols defines a space-generated multilevel coding scheme. That is to say, the elements shown to form portions of the transmit part generate space-generated multilevel-coded symbols, when detected at the receive antenna.

Figure 3:
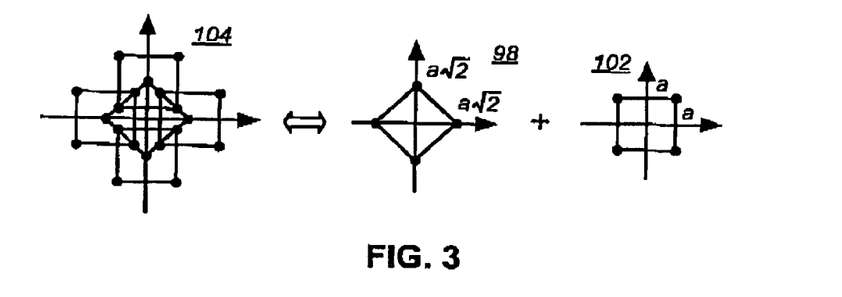
FIG. 3 illustrates a representation, similar to that shown in FIG. 2, but of the relationship between several other modulation constellations, also representative of modulation constellations utilized pursuant to operation of an embodiment of the present invention.

FIG. 3 also illustrates the symbols sets, here shown at 98 and 102, of two lower-order modulation schemes together with the symbol set 104 of a higher-order modulation scheme. Here, the symbol set 104 is of a 16 QAM (quarternary amplitude modulation) scheme. And, the symbol sets 98 and 102 are each of QPSK (quarternary phase shift keying) modulation schemes. Superposition of the values of the two QPSK symbol sets 98 and 102 form the symbol set 104 of the 16 QAM modulation scheme. When, for instance, the modulators 56-1 and 56-N shown in FIG. 1 operate pursuant to the modulation schemes represented by the symbol sets 98 and 102, the superposition effect at the receive antenna 76 causes the received values of the symbols to be elements of the symbol set 104. In this example, the constellations 98 and 102 have the same power.

The channels defined upon the radio links upon which the modulated symbols are communicated might well exhibit flat-fading conditions. That is to say, each of the channels 72-1 and 72-N exhibit flat-fading conditions. With respect to the SGMC system, the transmitted symbols and the channels, respectively, are represented by $z_k$ and $h_k$ where k=1, 2. The channels are zero-mean, complex Gaussian random variables with unit variance. It is not necessary for $z_1$ and $z_2$ to have the same transmitted energy per symbol. Instead the antennas can be power imbalanced, as shown in the example of FIG. 2. And, knowledge is available of the channel conditions, here determined by the CSI determiners.

Figure 4:
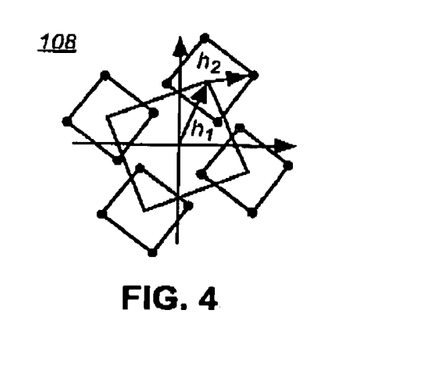
FIG. 4 illustrates a representation of the constellation points of an exemplary SGMC (space-generated multilevel coding) scheme formed pursuant to operation of an embodiment of the present invention in the presence of fading conditions and without compensation for the effects of the fading.

FIG. 4 illustrates a symbol set, shown generally at 108, of symbols detectable at the receive antenna 76 (shown in FIG. 1). Here, the symbols of the constellation set are given by c wherein $c=h_1*z_1+h_2*z_2$. The randomness of $h_k$ wherein k=1, 2 can reduce the minimum distance of the superimposed constellation set. In some situations, some of the constellation symbols overlap. And, in such situations, the informational content of the communicated data can not be reliably recovered.

Through the use of the space-generated multilevel coding provided pursuant to an embodiment of the present invention, the separations between the symbols of the higher-level modulation symbol set are maintained without increasing redundancy in time or space. And, improved operation is provided if the channels upon which the data is communicated are highly-correlated, a burst transmission technique is utilized, and a feedback mechanism is utilized.

First, communications in a scheme in which the channels 72 are uncorrelated is described. To preserve the shape of the modulation constellation of the symbols detectable at the receive antenna 76, weighting factors are applied, here indicated by $w_1$ and $w_2$ (where N in FIG. 1 is of a value of 2) such that:

$$h_1*(w_1*z_1)+h_2*(w_2*z_2)=z_1+z_2. \quad\quad 1$$

This equation holds if $w_k=1/h_k$, where k=1, 2. That is to say, channel coefficients, forming full feedback information, are returned to the transmit part 42 for each of the transmit paths of proper values so that the equation holds.

By providing, instead, only partial feedback information, the amount of feedback information that needs to be returned to the transmit part is reduced. For example, one weighting factor value is, in one implementation, utilized, such as where $w=h_1/h_2$. And, the following equation is established:

$$h_1*z_1+h_2*w*z2=h_1*(z_1+h_2/h_1*w*z_2)=h_1*(z_1+z_2) \quad\quad 2$$

Thereby, the amount of feedback is reduced. However, account must be taken in the detection process that the symbols of the constellation points are scaled by a complex number $h_1$.

The use, instead, of relative channel-strength feedback information can further reduce the amount of feedback information that is required to be returned. Here, the weighting factor is selected to be $w=|h_1/h_2|$. The modulation symbol constellation at the receive antenna is:

$$h_1*z_1+h_2*w*z_2=h_1*(z_1+h_2/h_1*w*z_2)=h_1*(z_1+e^{-j\Delta\phi}*z_2) \quad\quad 3$$

where $\Delta\phi$= angle ($h_1$, $h_2$).

Figure 5:
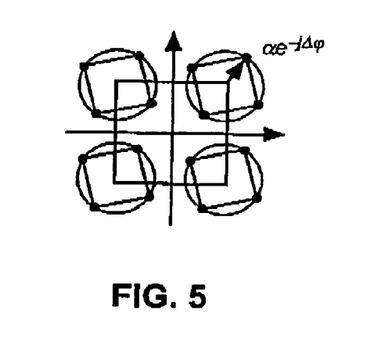
FIG. 5 illustrates a representation of exemplary variation of the values of modulation symbols when relative channel-strength feedback information is provided to a sending station pursuant to operation of an embodiment of the present invention.

The result of the uncompensated phase $\Delta\phi$ on the constellation is shown in FIG. 5. The effect of $h_1$ is not included. Thereby, the toll for reducing the amount of feedback, i.e., the feedback payload, is a reduction in the constellation minimum distance. However, the points are still distinct. If desired, the feedback can be set to $w=\alpha*|h_1/h_2|$, wherein $\alpha$=const<1 to increase the constellation minimum distance.

The amount of feedback that is required to be returned is further reduced when data-burst transmissions are sent. The receive part 38 observes the channels and triggers data transmission when a selected rule is satisfied. An exemplary rule is:

$$||h_2/h_1|-\alpha|<\epsilon \quad\quad 4$$

with the known constants, $\alpha<1$ and $\epsilon$ is a small number. The value of $\epsilon$ provides the operational range that triggers the transmission, and together with alpha, the constellation minimum distance is set. An objective is to have non-overlapped symbols in the superimposed constellation set.

In this scenario, the received signal is:

$$r=h_1*z_1+h_2*z_2+n \quad\quad 5$$

and the data can be detected based upon:

$$(z_1,z_2)=\min|r-(h_1*z_1+h_2*z_2)|^2. \quad\quad 6$$

When the channels are substantially uncorrelated, the values of the weighting factors also tend to be uncorrelated from one time period to another and, correspondingly, to have large swings in value. If, conversely, the channels are correlated, the weighting factors are correlated in time and their values vary within a smaller range of values. When the channels are correlated, predictive techniques can be utilized to predict the values required of the weighting factors. And, the smaller range of values provides a hedge against some inherent errors that can occur when the values are received.

When the channels 72 are correlated, and the value of $w=|h_1/h_2|$, and the correlation coefficient is $\rho$, then the probability density function (pdf) of w is:

$$p(w)=[2*(1-\rho^2)*w^{2n-1}*(1+w^2)]/[B(n,n) *((1+w^2)^{n+1/2}] \quad\quad 7$$

where n is the number of paths on a channel 72 and B(n,n) is the beta function.

Figure 6:
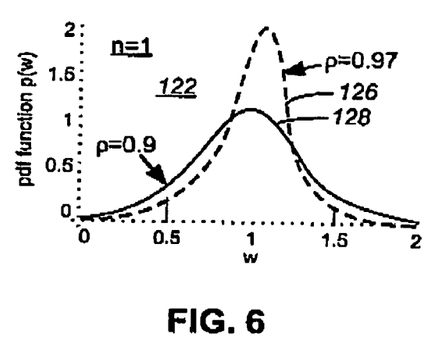
FIG. 6 illustrates a graphical representation of probability distribution functions of appropriate weighting factors to be selected at a receiving station and returned to a sending station for single-path channels in a system that communicates data upon highly-correlated channels.
Figure 7:
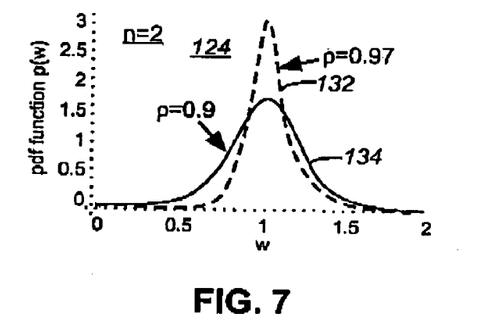
FIG. 7 illustrates a graphical representation of probability distribution functions, similar to those shown in FIG. 6, but for two-path channels that are highly-correlated.

FIGS. 6 and 7 illustrate graphical representations, shown generally at 122 and 124, respectively, the probability density functions of w for flat-fading channels having differing correlation coefficient values. FIG. 6 illustrates a scenario in which n=1, that is, the number of channel paths is one. The probability density function 126 is for a correlation coefficient value of $\rho$=0.97. And, the probability density function 128 is for a correlation coefficient value of $\rho$=0.9. And, FIG. 7 illustrates a scenario in which n=2. The probability density function 132 is for a correlation coefficient value of $\rho$=0.97. And, the probability density function 134 is for a correlation coefficient value of $\rho$=0.90.

Analysis of the graphical representation show that, as the number of paths n or the correlation coefficient $\rho$ increases, the probability that the instantaneous value of w is close to one increases. The higher the correlation coefficient is, the better that the constellation symbols are separated and the constellation resembles with the superimposed one in the Gaussian channel at the receive antenna. In forms of a limit representation, if ρ approaches 1, then $h_2$ approaches $h_1$, and the receive constellation is $h_1*(z_1+z_2)$. Thereby, the space-generated multilevel coding is well suited for highly correlated channels and burst-type data transmission.

Figure 8:
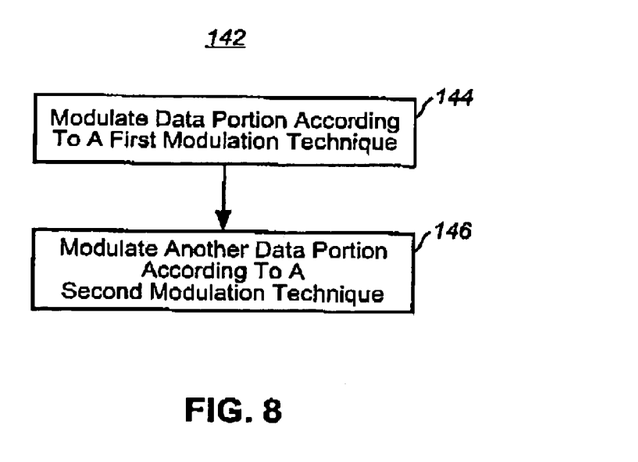
FIG. 8 illustrates a method flow diagram of the method of operation of an embodiment of the present invention.

FIG. 8 illustrates a method flow diagram, shown generally at 142, representative of the method of operation of an embodiment of the present invention. The method facilitates communications in a communication system having a first communication station operable at least to send data, sourced at a data source, upon a communication channel.

First, and as indicated at the block 144, at least a first portion of a representation of the data is modulated pursuant to a first modulation scheme to form first modulated symbols. The first modulated scheme utilizes a first constellation set of allowable symbol values. Then, and as indicated by the block 146, at least a second portion of the representation of the data is modulated pursuant to at least a second modulation scheme to form at least second modulated symbols. The second modulation scheme utilizes a second constellation set of allowable symbol values. The first and second modulation schemes are selected such that the first and second modulated symbols, when superimposed upon one another, form higher-order modulation symbols, selected pursuant to a higher-order modulation scheme.

Through proper selection of the modulation schemes, superpositioning of the symbols permits symbols of the symbol set of the higher-order modulation scheme to be formed at a single receive antenna of the receiving station. Thereby, high data throughput rates are achievable without the complexity required of a multiple receive-antenna configuration. And, because lower-order modulation schemes, such as constant-envelope schemes, are used to form modulated symbols that are communicated during operation of the communication system, the linearities required of power amplifiers used to amplify the modulated symbols are reduced relative to the linearities required of the power amplifiers to amplify modulated symbols formed pursuant to a nonconstant-envelope modulation scheme.

The previous descriptions are of preferred examples for implementing the invention, and the scope of the invention should not necessarily be limited by this description. The scope of the present invention is defined by the following claims.

I claim:

1. Apparatus for a first communication station operable in a communication system at least to send data, sourced at a data source, upon a communication channel, said apparatus comprising:
   a set of at least two modulators coupled to receive corresponding portions of a representation of the data to be sent by the communication station, said set of modulators for modulating the corresponding portions of the representation of the data pursuant to the corresponding modulation scheme to form the corresponding modulated symbols, the said corresponding modulated symbols being allowable values selected from the corresponding constellation of the corresponding modulator; and
   the said constellations pertaining to corresponding modulators forming a set of constellations, selected such that due to superimposition effect upon one another, generate higher-order modulation symbols, selected pursuant to a higher-order constellation.

2. The apparatus of claim 1 further comprising an encoder adapted to receive the data sourced at the data source, said encoder for encoding the data pursuant to an encoding scheme to form thereby encoded data, and wherein the representation of the data, each of the modulator from the said set of modulators is coupled to receive at least portions of encoded data.

3. The apparatus of claim 1 wherein the constellations corresponding to the said modulators are constant envelope constellations.

4. The apparatus of claim 1 further comprising a transmit antenna assembly, said transmit antenna assembly having each transmit antenna coupled to corresponding modulator from the set of said modulators, exhibiting a level of correlation at least greater than a selected threshold.

5. The apparatus of claim 1 further comprising: a set of weighting elements, each weighting element of said set of weighting elements coupled to the corresponding modulator of said set of modulators to receive the corresponding modulated symbols formed thereat in order to apply to the said modulated symbols the corresponding weighting factor.

6. The apparatus of claim 5 wherein the weighting elements of the said set of weighting elements have in general dissimilar values.

7. The apparatus of claim 5 wherein the weighting elements of the said set of weighting elements are of selectable values.

8. The apparatus of claim 6 wherein the communication station is further operable to receive externally-generated signals and wherein the selectable values of the weighting factors corresponding to the said set of weighting elements are selected responsive to the externally-generated signals.

9. The apparatus of claim 8 wherein the communication system further comprises a second communication station, the second communication station at least for sending the said externally-generated signals used to select the said weighting factors, by which the corresponding said weighting elements are weighted.

10. The apparatus of claim 9 wherein the second communication station further obtains a set of communication-channels indicia associated with the communication channels upon which data is sent by the first communication station, and wherein the externally-generated signal comprise values related to the set of communication-channels indicia.

11. The apparatus of claim 10 wherein the communication channel comprises a set of communication channels paths upon which the said set of modulated symbols formed by said set of modulators are communicated and wherein time values of the set of communication-channels indicia of which the externally-generated signal is comprised are of values related to the set of communication channel paths.

12. The apparatus of claim 5 wherein the set of communication channel paths and the exhibit a level of correlation at least greater than a selected threshold, wherein the second communication station further operates to predict the set of communication-channels indicia.

13. Apparatus for a communication station operable to receive data pursuant to a space diversity scheme communicated to the communication station upon a communication channel formed of a first and at least a second communication channel path, said apparatus comprising:
   at least one antenna positioned to detect the data pursuant to the space diversity scheme, said antenna fur converting the data detected thereat into electrical form as a receive signal, the receive signal of values of the data sent upon the first and the at least the second communication path superimposed theretogether;

a feedback generator adapted to receive indications of communication channel indicia associated with the first and the at least second communication channel paths, said feedback generator far generating feedback values for return to the communication station to be used thereat, the feedback values selected to facilitate increase of constellation-symbol separation distance of data symbols of the receive signal formed of the data sent upon the first and the second communication pat superimposed theretogether.

14. A method for facilitating communications in a communication system having a first communication station operable at least to send data, sourced at a data source, upon a communication channel, said method comprising:

modulating at least a first portion of a representation of the data pursuant to a first modulation scheme to form first modulated symbols, the first modulation scheme utilizing a first constellation set of allowable symbol values; and modulating at least a second portion of the representation of the data pursuant to at least a second modulation scheme to form at least second modulated symbols, the second modulation scheme utilizing a second constellation set of allowable symbol values, the first and second modulation schemes, respectively, selected such that the first and second modulated symbols, due to a superimposition effect upon one another, form higher-order modulation symbols, selected pursuant to a higher-order modulation scheme.

15. The method of claim 14 wherein the conmnuinication system further comprises a second communication station, said method further comprising the operations of: sending the first modulated symbols upon a first communication-channel path and the second modulated symbols upon a second communication-channel path pursuant to a space diversity scheme; and detecting the first modulated symbols and the second modulated symbols at a first antenna of the second communication station, the first modulated symbols and the second modulated symbols superimposed theretogether to form the higher-order modulation symbols.

16. The method of claim 15 further comprising the operations of: selectably weighting the first modulated symbols at the first communication station with a first weighting factor; and selectably weighting the at least second modulated symbols at the first communication station with the corresponding weighting factor.

17. The method of claim 16 further comprising the operation of selecting, at least the second communication station, values of the first weighting factor and of the second weighting factor.

18. The method of claim 14 wherein the first modulation scheme and at least the second modulation scheme are both constant envelope modulation schemes.

* * * * *